Nov. 27, 1928.  
C. HAMPEL  
1,693,113  
ANIMAL FEEDING DEVICE  
Filed Sept. 30, 1927    2 Sheets-Sheet 1

INVENTOR.  
CARL HAMPEL  
BY Ralph B. Stewart  
ATTORNEY.

Nov. 27, 1928. 1,693,113
C. HAMPEL
ANIMAL FEEDING DEVICE
Filed Sept. 30, 1927  2 Sheets-Sheet 2

INVENTOR.
CARL HAMPEL
BY Ralph B. Stewart
ATTORNEY.

Patented Nov. 27, 1928.

1,693,113

UNITED STATES PATENT OFFICE.

CARL HAMPEL, OF JACKSON, MICHIGAN.

ANIMAL-FEEDING DEVICE.

Application filed September 30, 1927. Serial No. 222,959.

My invention relates to a device for feeding or watering animals from the outside of the animal enclosure.

In feeding and watering animals of a timid nature such as foxes, it is very desirable to disturb them as little as possible. Heretofore, it has been customary for the attendant to go within the enclosure and leave the food and water in pans on the ground. The presence of the attendant within the pen or enclosure not only excites the foxes, but it requires a great deal of time on the part of the attendant to open and close each pen and deposit the feeding pan. Furthermore, in eating the food from the pans left in this manner, the animals very often move the pans to the rear of the pen, and in this way more time is required on the part of the attendant is retrieving the pans at the next feeding time. Furthermore, the pans are very often overturned by the foxes, resulting in a considerable loss of food.

My invention aims to overcome the disadvantages encountered in feeding such animals as described above.

An object of my invention is to devise a device whereby a feeding or watering pan or receptacle may be inserted into and removed from the animal pen without the necessity of entering the pen.

A further object is to devise a support for a feeding or watering pan which will support the pan within the enclosure without danger of being overturned or moved to an inaccessible position by the animals.

Another object is to devise a support for a feeding or watering pan characterized by simplicity and ruggedness of structure, a support which is not likely to get out of order, and one which may be easily kept clean.

A further object of my invention is to devise a support for a feeding receptacle whereby the receptacle may be readily removed for the purpose of cleaning or for replenishing the food.

My invention also has for an object the production of a unitary structure for removably supporting a feeding pan within an animal pen, said unitary structure being readily attachable to existing pens with simple tools and with a minimum amount of labor.

My invention is illustrated in the accompanying drawing, in which like parts are represented by the same reference numerals.

Figure 1:
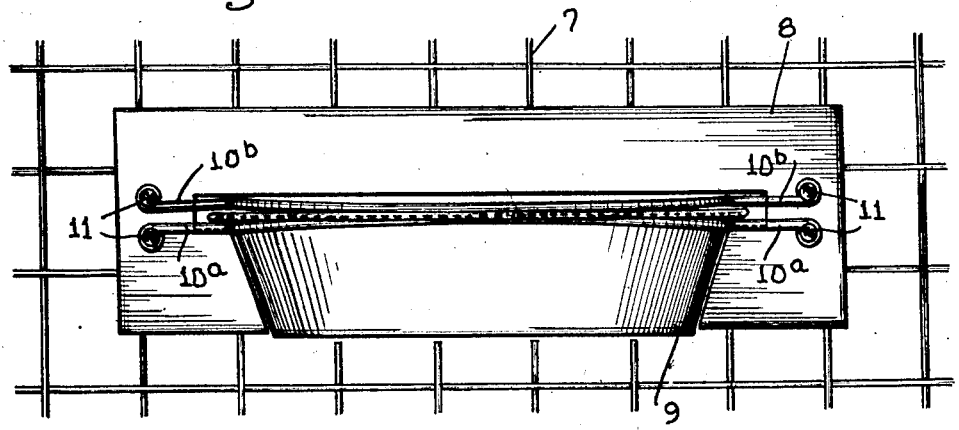
Fig. 1 is a view in elevation of one form of my feeding device as seen from within the pen.
Figure 2:
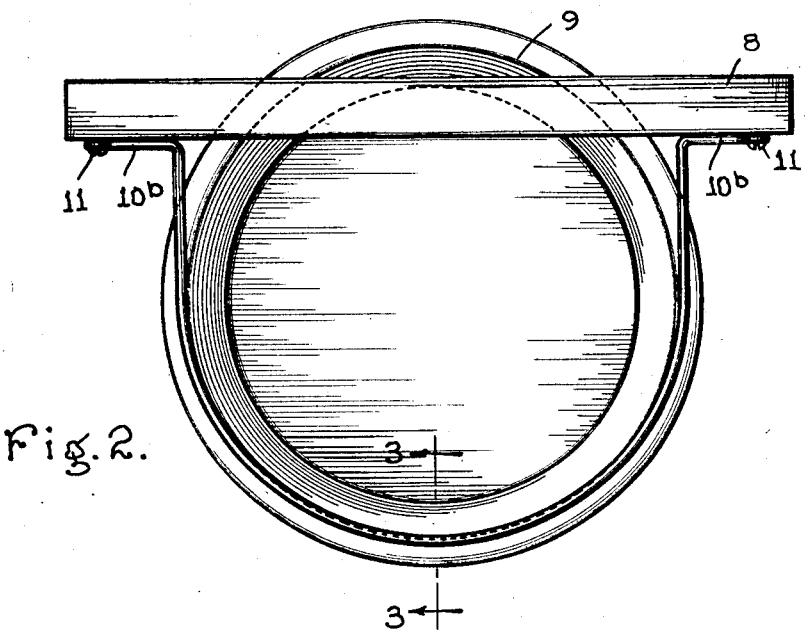
Fig. 2 is a plan view of Fig. 1.
Figure 3:
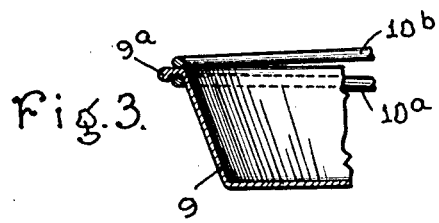
Fig. 3, is a sectional view of Fig. 2 taken along line 3—3.

In the drawing 7 represents a wire mesh forming the walls of the fox pen or enclosure. Secured to this wall by any suitable means is a base plate 8 made of any suitable material, preferably of wood. The base plate 8 contains an aperture following the general outline of the feeding pan 9 which is shown positioned in said aperture. The pan 9 is provided with a beaded projecting flange $9^a$. In Fig. 1 two substantially U-shaped supporting members $10^a$ and $10^b$ are secured by any suitable means, such as screws 11, to the inner side of base plate 8. These supporting members are preferably made of stiff spring wire material, although it is to be understood, that they may take various forms and may be made of various materials. The lower supporting member $10^a$ forms a seating member for the support of the pan 9 from the rim $9^a$. The upper supporting member $10^b$ is substantially like the supporting member $10^a$ and is arranged to engage the upper side of rim $9^a$ and to thereby resiliently hold the pan upon supporting member $10^a$. When the pan is removed from the holder the two members $10^a$ and $10^b$ are forced into contact with each other at the rear side by their spring action. One of the members $10^a$ or $10^b$ may, if desired, be made non-resilient, for example, it may be made of a strip of sheet material bent to form a cylindrical wall open on one side. It will thus be seen that the two supporting members $10^a$ and $10^b$ cooperate with the bead on rim $9^a$ to form a spring clamp for retaining the pan in position. The supporting members 10ª and 10ᵇ are so designed as to support the pan 9 almost entirely within the pen, leaving only enough of the pan projecting to the outside to facilitate its removal by hand.

It is to be noted that the straight sides of supporting members 10ª and 10ᵇ form parallel guide members cooperating with the rim of the pan to hold the pan in proper position while it is being inserted within the support. Due to the clamping action of members 10ª and 10ᵇ the pan cannot be readily dislodged by the animals and pushed to the outside of the cage, but the pan may be readily removed by the attendant. It will be appreciated that the pan 9 cannot be overturned or removed from the holder in any manner by the animals.

Figure 4:
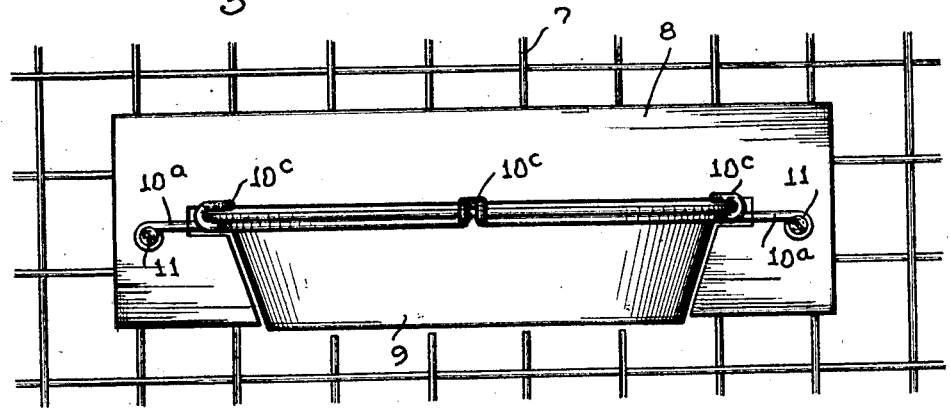
Fig. 4, is a view like Fig. 1 of a second modification of my invention.
Figure 5:
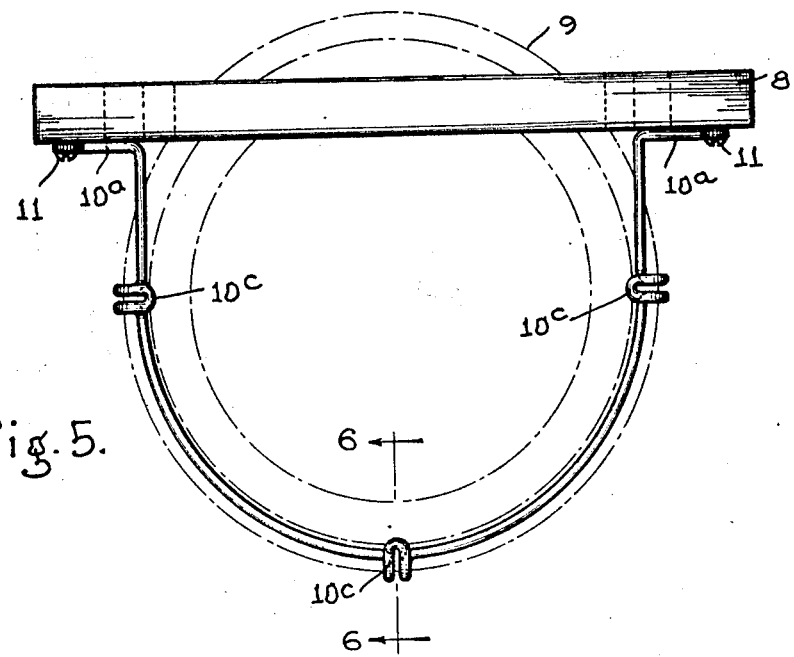
Fig. 5, is a plan view of Fig. 4.
Figure 6:
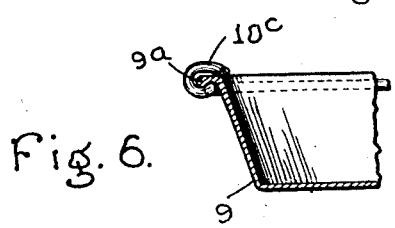
Fig. 6, is a sectional view of Fig. 5 taken along line 6—6.

In Figs. 4, 5 and 6, I have shown another form of my invention in which the function of the upper supporting member 10ᵇ in Fig. 1 is performed by a number of clip members 10ᶜ formed on supporting member 10ª. As shown in Fig. 6, the rear clip member 10ᶜ is so formed as to constitute a spring clip for cooperating with the beaded rim 9ª to retain the pan in proper position. In Figs. 4, 5 and 6, I have shown the clip members 10ᶜ as formed from the same wire that forms the supporting member 10ª, but it is to be understood that the supporting member 10ª may be as shown in Fig. 1, and the clip members 10ᶜ may be formed of separate pieces and secured to the supporting member in any desired manner such as by soldering, brazing or welding. It will also be apparent to one skilled in the art that the supporting member 10ª with the clip members 10ᶜ may be formed from sheet metal by usual stamping and bending processes.

It is to be understood that an opening must be made in wire 7 to permit the insertion and removal of pan 9. The base plate 8 may be secured to wire 7 by ordinary wire staples, or if desired, it may be secured to the wire by placing a second plate similar to plate 8 on the outside of the wire, and clamping the two plates together by any suitable means.

It is apparent to one skilled in the art that instead of making base plate 8 of wood, this plate may be made from sheet metal by stamping or otherwise. It is also apparent that many other changes may be made in the details of my invention without departing from the spirit thereof.

What I claim is:

1. A feeding device comprising a receptacle having a laterally projecting rim, a base plate having an aperture for receiving said receptacle, and means for supporting said receptacle within said aperture by said rim comprising a substantially U-shaped member engaging the projecting rim, the free ends of said member being secured to said base plate on opposite sides of said aperture.

2. A support for a feeding pan comprising, a base plate having an aperture therein for admitting the pan, a substantially U-shaped supporting member secured to one side of said base plate and adapted to slidably support said pan by engaging the lower side of the rim of the pan, and means also supported by said base plate for resiliently holding said pan upon said supporting member.

3. A support for a feeding pan comprising, a base plate having an aperture therein to permit the pan being passed through the plate, means secured to said plate for slidably supporting said pan within said aperture, means for limiting the movement of the pan upon the supporting means in one direction, and means for resiliently holding said pan in said limiting position.

4. A feeding device comprising a receptacle having a projecting rim, a base plate having an aperture therein to permit the receptacle to be passed through the plate, a substantially U-shaped supporting member secured at each end to said plate adjacent said aperture and extending to one side of said plate to form a support for said receptacle, said supporting member being shaped to conform to the shape of said receptacle and to support said receptacle by said rim.

5. A feeding device comprising a feeding pan having a beaded projecting rim, a base plate having an aperture therein for receiving the pan, guide members arranged above and below the rim of said pan and supported by said base plate, at least one of said guide members comprising a spring element for resiliently holding said beaded rim between said guide members.

6. An animal feeding device comprising an animal enclosure, a base plate secured to a wall of said enclosure, a feeding receptacle having a beaded projecting rim, said enclosure and said base plate having registering apertures to permit the receptacle to be passed into said enclosure, guide members arranged above and below the rim of said receptacle and supported by said base plate, at least one of said guide members comprising a spring element for engaging the beaded rim to hold the receptacle in proper position.

7. A feeding device comprising a receptacle having a beaded projecting rim, a vertical base plate having an aperture therein for receiving the receptacle, a substantially U-shaped supporting member the free ends of which are secured to said base plate on opposite sides of said aperture, said supporting member forming a seat for the rim of said receptacle, a second U-shaped member secured to said base plate above the first member and arranged to engage the top side of said rim, whereby said receptacle is held in a horizontal position without danger of being overturned.

8. A feeding device comprising a receptacle having a beaded projecting rim, a vertical base plate having an aperture therein for receiving the receptacle, a substantially U-shaped supporting member the free ends of which are secured to said base plate on opposite sides of said aperture, said supporting member forming a seat for the rim of said receptacle, a second U-shaped member secured to said base plate above the first member and arranged to engage the top side of said rim, at least one of said members being biased towards the other, whereby said members constitute a clamp for engaging the beaded rim and retaining said receptacle in position.

In witness whereof I affix my signature.

CARL HAMPEL.